United States Patent [19]

Ansell

[11] 4,414,299
[45] Nov. 8, 1983

[54] ELECTROCHEMICAL CELLS WITH BETA ALUMINA CERAMIC ELECTROLYTE MATERIAL

[75] Inventor: Raymond O. Ansell, Warrington, England

[73] Assignee: Chloride Silent Power Limited, London, England

[21] Appl. No.: 386,842

[22] Filed: Jun. 9, 1982

[30] Foreign Application Priority Data

Jun. 15, 1981 [GB] United Kingdom ............... 8118321

[51] Int. Cl.³ ........................................... H01M 2/10
[52] U.S. Cl. ................................................ 429/104
[58] Field of Search ......................................... 429/104

[56] References Cited

U.S. PATENT DOCUMENTS

| 4,037,028 | 7/1977 | Mehaute et al. | 429/104 |
| 4,104,448 | 8/1978 | Gibson et al. | 429/104 |
| 4,267,807 | 9/1979 | Verity | 429/104 |

Primary Examiner—Donald L. Walton
Attorney, Agent, or Firm—Beveridge, DeGrandi & Kline

[57] ABSTRACT

In an electrochemical cell, e.g. a sodium sulphur cell, employing tubular beta alumina ceramic material, the electrolyte is put under axial compression, for example using spring means, to reduce the risk of mechanical failure arising from tensile stress in the material.

9 Claims, 4 Drawing Figures

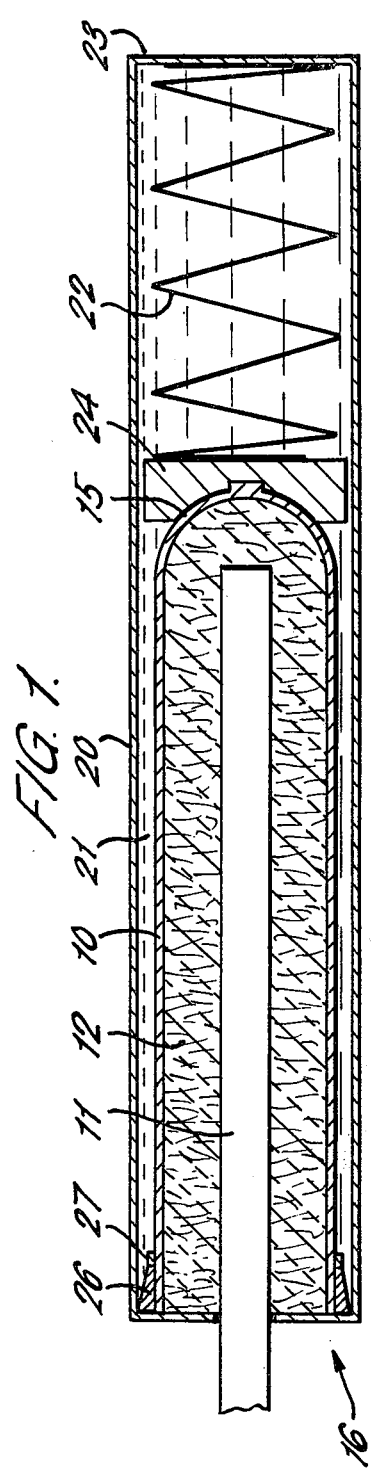
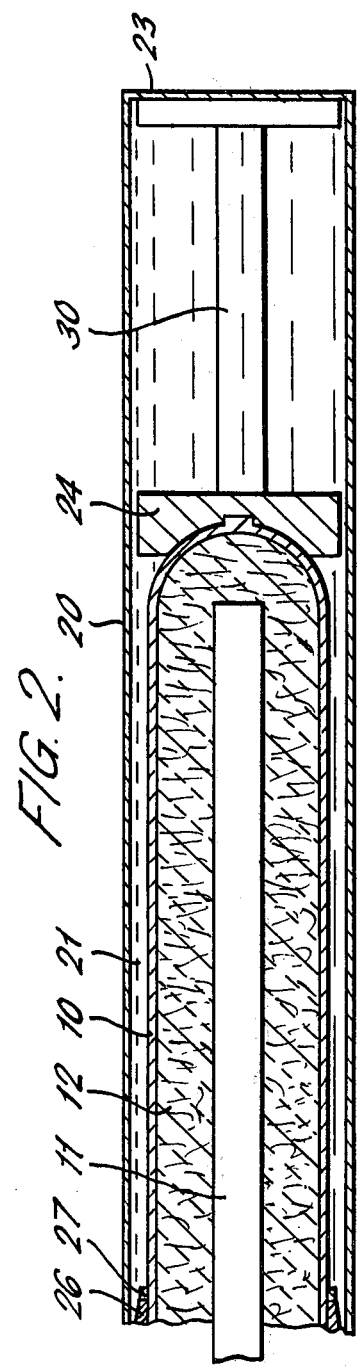

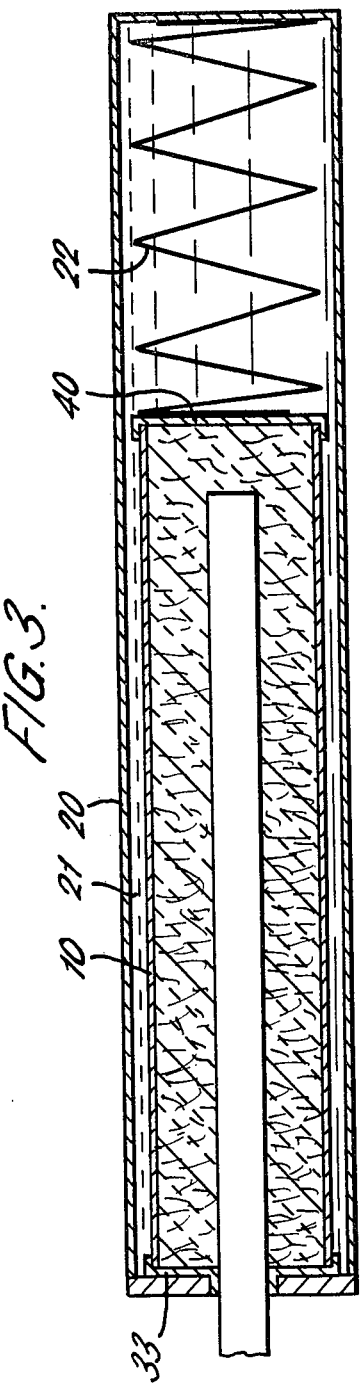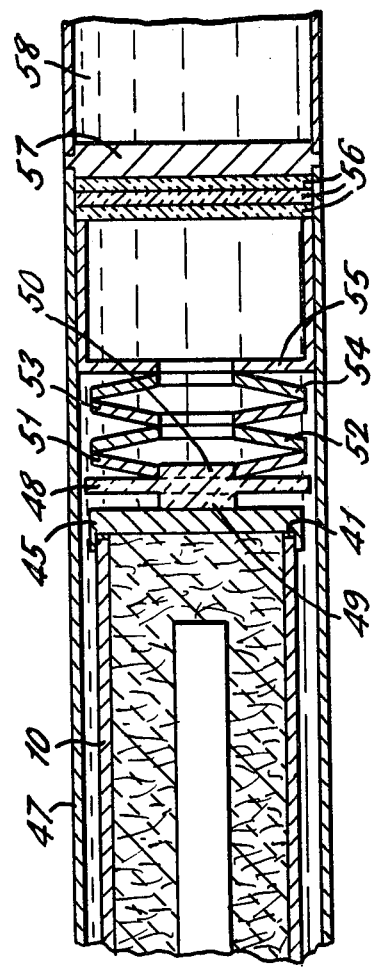

ELECTROCHEMICAL CELLS WITH BETA ALUMINA CERAMIC ELECTROLYTE MATERIAL

FIELD OF THE INVENTION

This invention relates to electrochemical cells using tubular beta alumina ceramic electrolyte material.

The possibility of mechanical failure of beta alumina electrolyte material in an electrochemical cell is increased if the material is subject to tensile stresses. Such stresses occur for example if a tube of electrolyte material is subjected to bending. More particularly however failure of the electrolyte material by dendritic penetration is exacerbated by tensile stress in the material.

SUMMARY OF THE INVENTION

According to the present invention, in an electrochemical cell having a tube of beta alumina ceramic electrolyte material, means are provided for applying a compressive load, at least when the cell is at the operating temperature, to the beta alumina tube in the axial direction along the whole length or substantially the whole length of the tube.

It is known to apply compression to a beta alumina tube in the radial direction to reduce hoop stress, see for example British Patent Specification No. 1491929. Such radial compression however does not relieve tensile stresses such as might occur due to bending forces on the tube. In the arrangement of the present invention, the tube is compressed axially along its length. The means for applying the compressive load may comprise a support at one end of the tube against which the tube abuts and means for applying a force on the other end of the tube. This latter means may comprise a spring.

In a sodium sulphur cell, the sodium and the cathodic reactant comprising sulphur-sodium polysulphides have to be molten and such a cell typically operates at a temperature of 350° C. In such a cell operating at an elevated temperature, it may be convenient to utilise differential thermal expansion of materials to apply an axial load to the beta alumina tube when the cell is heated. Thus, in a cell in which the tube is supported against an abutment at one end, the tube may be located in an outer housing and, within this housing, there may be provided a thermal expansion element arranged between the housing and the second end of the tube arranged, on expansion due to rising temperature, to apply axial compressive loads onto the second end of the tube. Alternatively, by using a material with a coefficient of expansion less than that of the beta alumina, over the relevant temperature range, the means for applying an axial load to the tube might comprise an element around the tube and extending along its length, the element engaging the tube at or near its ends.

BRIEF DESCRIPTION OF THE DRAWINGS

FIGS. 1, 2, 3 and 4 are each diagrammatic sections through different embodiments of sodium sulphur cell.

DESCRIPTION OF THE PREFERRED EMBODIMENT

Referring to FIG. 1 there is shown diagrammatically a sodium sulphur cell of the central sulphur type having a beta alumina ceramic electrolyte tube 10 within which is located a cathode current collector 11 with a cathode element 12 between the current collector and the inside surface of the tube. In this example the tube is formed with a closed domed end 15 and is sealed at the other end by sealing means indicated diagrammatically at 16. Around the outside of the tube 10 within an outer cylindrical housing 20 is the anodic region 21.

Axial loading of the tube 10 is effected in this example by means of a helical compression spring 22 acting between one end 23 of the outer housing and an abutment member 24 bearing against the closed end of the tube 10. The axial load is supported at the other end by means of a stop 26 formed on the cell housing abutting against a ridge 17 extending around and formed integrally with the ceramic electrolyte material. The use of this stop 26 and ridge 27, in this particular example, is to avoid applying axial compression onto sealing means extending across the open end of the tube.

Although a central sulphur cell has been described, it will be readily apparent that the axial loading technique described above may equally well be applied to a central sodium cell.

FIG. 2 illustrates another construction of cell which is generally similar to that of FIG. 1 except in the way in which the axial loading is applied to the ceramic material. In the following description of FIG. 2 the same reference numerals are used as in FIG. 1 for corresponding components and reference will only be made to the distinctive features. In the arrangement of FIG. 2, axial loading is effected by means of a thermal expansion bar 30 arranged between the end of the housing and the abutment 24. A sodium sulphur cell operates at an elevated temperature typically about 350° C. and the thermal expansion bar is arranged so that, when the cell is raised to the operating temperature, the expansion of this bar, in relation to the differential expansion of the housing and of the beta alumina tube, applies the required compressive loading onto the tube.

FIG. 3 illustrates a construction very similar to FIG. 1 except in that, instead of using a tube having a domed closed end, the compressive loading is applied to a sealing plate 40 extending across and sealed to, e.g. by glazing, the open end of the tube 10. The tube may be similarly sealed at the other end as shown by the plate 33 and it will be noted that the compression spring maintains the seals under compression, as is desirable in this type of construction where the glazing serves to effect a hermetic seal between the end plate and the tube which are maintained in abutting contact by the compressive loading.

FIG. 4 illustrates another construction in which compressive loading is applied by disc springs to a sealing plate across the end of an electrolyte tube. In this figure, which shows part of a sodium sulphur cell of the central sulphur type, an alpha alumina disc 45 is sealed by a glass seal 46 to the open end of a beta alumina electrolyte tube 10 within a cylindrical metal housing 47. The annular region between the tube 10 and housing 47 constitutes the anodic region containing liquid sodium and, in the known way, may contain wicking means to keep the whole outer surface of the electrolyte tube wetted with liquid sodium. A metal location plate 48 having central bosses 49, 50 bears against the disc 45 with the boss 50 extending into a central aperture of a disc spring 51 to locate that spring. The spring 51 and three further disc springs 52, 53, 54 are dish shaped and serve to apply pressure to the disc 45 when the cell is assembled with these disc springs compressed between plate 48 and a reaction member 55. The reaction member 55 is held in position, via safety barriers 56, by a restrictor plate 57 welded to the housing 47. The restrictor plate has apertures permitting limited flow of sodium from a sodium reservoir 58 into the annular anodic region around the electrolyte tube 10. It will be seen that the disc springs 51–54 apply axially compressive loading to the electrolyte tube. In this embodiment, as in the other embodiments the axial compression eliminates tensile stress in the tube and this reduces the risk of mechanical failure.

I claim:

1. An electrochemical cell having a tube of beta alumina ceramic electrolyte material, wherein means are provided for applying a compressive load, at least when the cell is at the operating temperature, to the beta alumina tube in the axial direction along the whole length or substantially the whole length of the tube.

2. An electrochemical cell as claimed in claim 1 wherein the means for applying the compressive load comprise a support at one end of the tube against which the tube abuts and means for applying a force on the other end of the tube.

3. An electrochemical cell as claimed in claim 2 wherein the means for applying a force comprise a spring.

4. An electrochemical cell as claimed in claim 2 wherein the means for applying a force is a helical spring.

5. An electrochemical cell as claimed in claim 2 wherein the means for applying a force comprises at least one disc spring.

6. An electrochemical cell as claimed in claim 1 and arranged for operating at an elevated temperature, wherein differential thermal expansion means are arranged to apply the axial load to the beta alumina tube when the cell is heated.

7. An electrochemical cell as claimed in claim 6 and having an outer housing wherein one end of the tube is supported against an abutment, the tube being located in said outer housing and wherein, within this housing, a thermal expansion element is arranged between the housing and the second end of the tube arranged, on expansion due to rising temperature, to apply an axial compressive load onto the second end of the tube.

8. An electrochemical cell as claimed in claim 6 wherein the means for applying an axial load to the tube comprise an element around and coaxial with the tube wherein said coaxial element extends beyond said tube and engages said tube at or near the ends of the tube, and wherein the element is of a material having a coefficient of expansion less than that of the beta alumina, over the relevant temperature range.

9. An electrochemical cell as claimed in claim 1 wherein the beta alumina tube has an open end sealed by an alpha alumina disc and wherein the means for applying a compressive load to the beta alumina tube applies a force axially on to said alpha alumina disc.

* * * * *